US009079104B2

(12) United States Patent
Short

(10) Patent No.: US 9,079,104 B2
(45) Date of Patent: Jul. 14, 2015

(54) CREATION OF GAME-BASED SCENES

(75) Inventor: Gregory Short, San Diego, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 1667 days.

(21) Appl. No.: 11/474,849

(22) Filed: Jun. 26, 2006

(65) Prior Publication Data

US 2007/0298878 A1  Dec. 27, 2007

(51) Int. Cl.
*A63F 9/24* (2006.01)
*A63F 13/00* (2014.01)
*G06F 17/00* (2006.01)
*G06F 19/00* (2011.01)
*A63F 13/40* (2014.01)

(52) U.S. Cl.
CPC ......... *A63F 13/10* (2013.01); *A63F 2300/6018* (2013.01); *A63F 2300/634* (2013.01)

(58) Field of Classification Search
CPC ...... A63F 13/50; A63F 13/53; A63F 13/5378
USPC .......... 463/31–34, 43, 47; 345/582, 634, 716, 345/726, 764
See application file for complete search history.

(56) References Cited

U.S. PATENT DOCUMENTS

| | | | |
|---|---|---|---|
| 5,592,609 A * | 1/1997 | Suzuki et al. | 345/473 |
| 6,285,381 B1 * | 9/2001 | Sawano et al. | 715/726 |
| 6,539,652 B1 * | 4/2003 | Barry | 38/144 |
| 6,650,329 B1 | 11/2003 | Koike | |
| 6,780,113 B2 * | 8/2004 | Nojiri et al. | 463/47 |
| 6,835,137 B1 | 12/2004 | Nakamura | |
| 2002/0032056 A1 | 3/2002 | Oh | |

FOREIGN PATENT DOCUMENTS

| | | |
|---|---|---|
| JP | 2001-187266 | 7/2001 |
| JP | 2003-051032 | 2/2003 |
| JP | 2003-109025 | 4/2003 |
| JP | 2003-175284 A | 6/2003 |

(Continued)

OTHER PUBLICATIONS

PCT Application No. PCT/US2007/14993; International Search Report and Written Opinion dated Sep. 18, 2008.

(Continued)

*Primary Examiner* — Milap Shah
*Assistant Examiner* — Jason Pinheiro
(74) *Attorney, Agent, or Firm* — Lewis Roca Rothgerber LLP

(57) ABSTRACT

A method is given for providing a visualization of a scene corresponding to game play. The method includes steps of receiving at a visualization server information about a scene corresponding to game play at a client computer, receiving additional information about the scene at the visualization server; and constructing a visualization at the visualization server based on the scene, the constructing based at least in part on the received information and the received additional information. In another embodiment, the visualization may be composed by the user rather than being a scene corresponding to game play. In a further embodiment, a method is given for providing a visualization of a scene corresponding to game play, including: receiving at a visualization server information about a scene corresponding to game play at a client; modifying the scene information; and constructing a visualization at the visualization server based on the modified scene information.

22 Claims, 2 Drawing Sheets

(56) References Cited

FOREIGN PATENT DOCUMENTS

| | | |
|---|---|---|
| JP | 2004-041645 | 2/2004 |
| JP | 2004-165750 | 6/2004 |
| WO | 96/00601 | 1/1996 |
| WO | WO 2008/002639 | 1/2008 |

OTHER PUBLICATIONS

Japanese Application No. 2009-518263, Final Office Action dated Jun. 13, 2014.

* cited by examiner

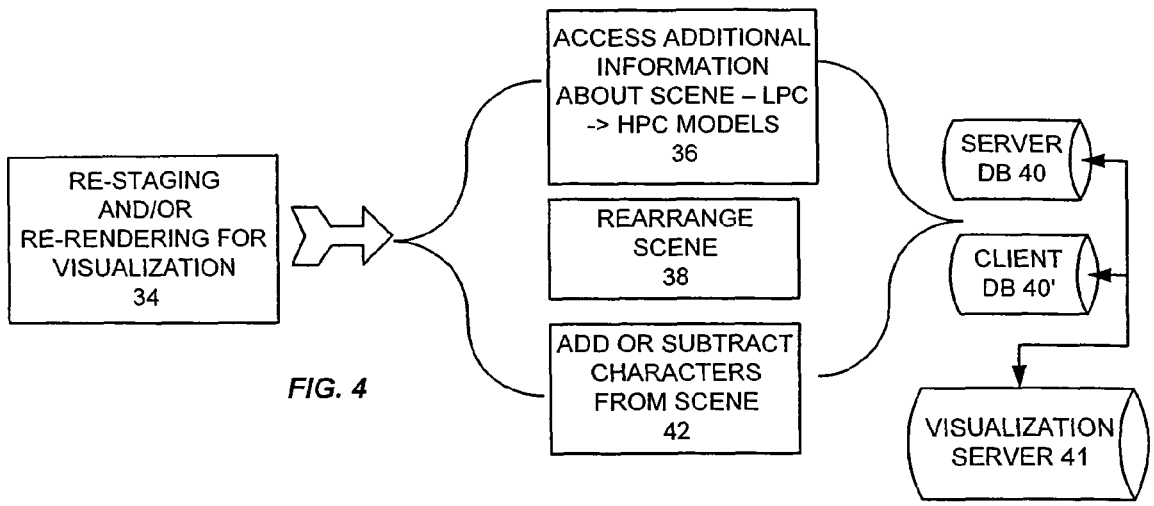
FIG. 4
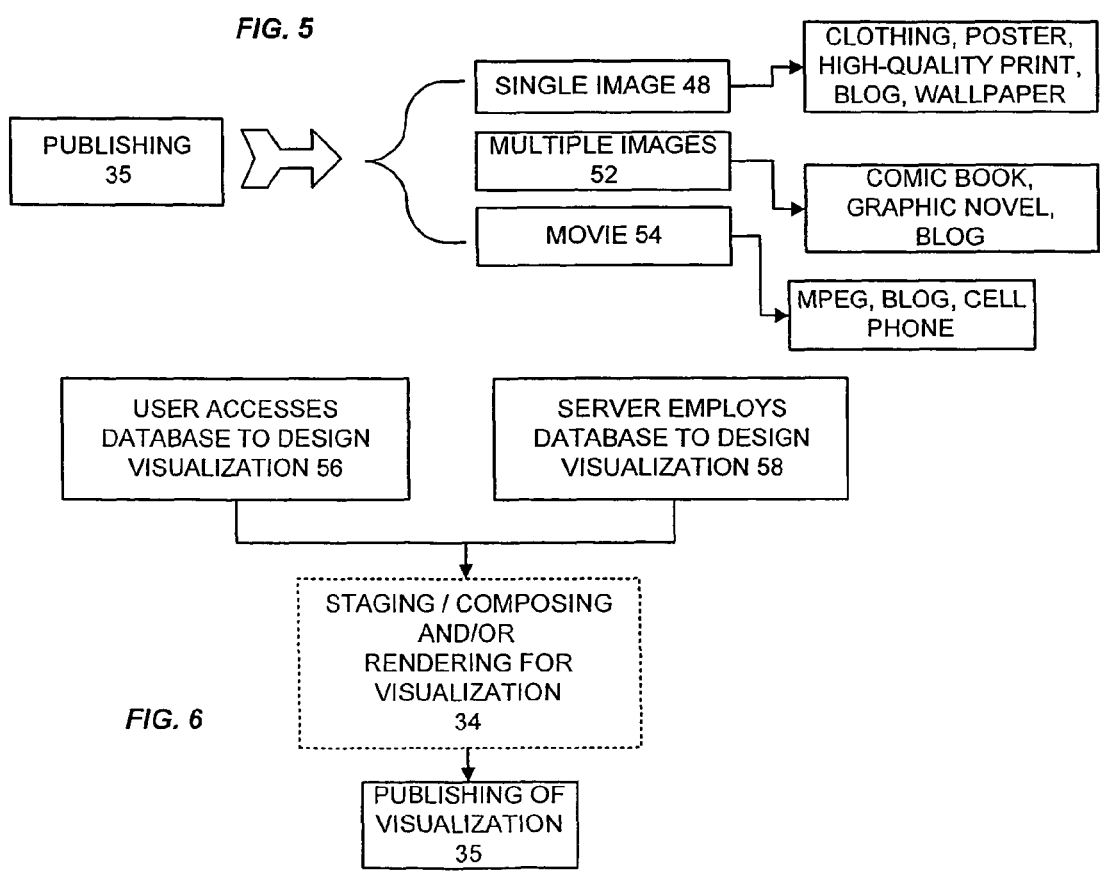

CREATION OF GAME-BASED SCENES

FIELD OF THE INVENTION

The invention relates to capturing and recreating, or composing, scenes corresponding to gameplay in computer games.

BACKGROUND OF THE INVENTION

Players of games, especially massively multiplayer online games, often enjoy reviewing their prior game play, e.g., in order to share with other players their experiences. However, visually re-creating the gameplay can be cumbersome. Screenshots or screen captures are typically of low resolution, are inconvenient to perform, and often are incapable of fully capturing the richness of the gameplay experience or event depicted. For example, players may be off-screen or otherwise not pictured, oriented inconveniently, etc.

In such systems, and referring to prior art FIG. 1, at some point during gameplay (step 20) a screenshot is effected (step 22) that is then rendered in a graphical way (step 24). For example, a screen capture program may reproduce the desired scene in a .png or .jpg format.

In addition to failing to capture the richness of much game play, screenshots are incapable of providing an image of an arbitrarily-designed scene, e.g., one that is designed by the user.

SUMMARY OF THE INVENTION

Embodiments of the invention provide images of moments of game play or compositions using characters or scenery from game play. These images or compositions, which may be high-quality for certain applications and lower-quality for others, are termed "visualizations".

In one aspect, the visualization is based on a displayed scene at a specified moment of game play, taking into account character positions, states of action, accomplished quests, etc. However, the overall scene may be rendered in high-polygon-count models as such data may be stored on the server, as opposed to the low-polygon-count models displayed on the client computer. In other words, the visualization looks like a high-quality reproduction of the scene, rather than a screenshot of the scene. The visualization may be caused to occur at defined points in a game, or on demand by the player.

In another aspect, the characters, objects, and backgrounds in the visualization may be re-staged, e.g., according to a defined scene or as desired by the player. For example, characters may be staged in the visualization who were not visually present to the player at the specified moment of game play, or characters may be added who were not in the original scene at all. These other characters may be positioned or oriented differently than they were during actual play. Players may also be removed if desired. In addition, besides depicting game play, pictures may be composed or staged that are entirely defined by the player or server.

The visualization may be used, e.g., as a design for a T-shirt, poster, or other high-quality print, or a series of still visualizations may be used to create a comic book or may be used to embellish a web log or "blog". A high-quality movie, e.g., an mpeg, may also be constructed from a sequence of visualizations.

The game may be a single-player or multi-player game; the invention only requires that occasional, even if only one-time, online access be available so that the requisite data may be transferred.

In one aspect, the invention is directed to a method of providing a visualization of a scene corresponding to game play. The method includes steps of receiving at a visualization server information about a scene corresponding to game play at a client computer, receiving additional information about the scene at the visualization server; and constructing a visualization at the visualization server based on the scene, the constructing based at least in part on the received information and the received additional information.

In another aspect, the invention is directed to a computer-readable medium having computer-executable instructions for performing the above steps.

Implementations of the invention may include one or more of the following. The additional information may be received from a game server or from the client. The visualization server may be the same as the game server. The additional information may correspond to added or subtracted characters, re-staged or re-positioned characters, or higher resolution views of characters or scenery than that displayed at the client. The scene may be chosen based on user input at the client or by the game server, e.g., the scene may be automatically determined by the game server following completion of one of a predefined set of tasks, or may be automatically determined by the game server in a periodic fashion. The method may further include creating and/or publishing one or a plurality of visualizations. The publishing may be, e.g., inserting the plurality of visualizations into a web log, inserting the plurality of visualizations into a comic book, or inserting the plurality of visualizations into an electronic document and storing the electronic document on a game server for later downloading. The method may further include creating a plurality of substantially continuous visualizations to form a movie, and/or storing the movie on a game server for later downloading. Where one visualization is published, the publishing may include creating a high-quality print of the visualization, creating an article of clothing that displays the visualization, and creating a poster of the visualization.

In another aspect, the invention is directed to a method of creating a visualization of a scene related to game play, including: receiving at a visualization server information from a client about a scene desired to be visualized, the information including information about scenery if any to be included in the visualization, characters if any to be included in the visualization, and placement of the scenery and the characters; receiving additional information about the scenery and characters at the visualization server; and constructing a visualization at the visualization server based on the scenery and characters, the constructing based at least in part on the received information and the received additional information.

In another aspect, the invention is directed to a computer-readable medium having computer-executable instructions for performing the above steps.

Implementations of the invention may include one or more of those noted above.

In another aspect, the invention is directed to a method of providing a visualization of a scene corresponding to game play, including: receiving at a visualization server information about a scene corresponding to game play at a client; modifying the scene information; and constructing a visualization at the visualization server based on the modified scene information.

Other features and advantages of the invention will be apparent from the description that follows, including the figures and claims.

BRIEF DESCRIPTION OF THE DRAWINGS

The invention is best understood from the following detailed description when read in conjunction with the accompanying drawings.

FIG. 4 shows details of a step in the flowchart of FIG. 2.

FIG. 5 shows details of a step in the flowchart of FIG. 2.

FIG. 6 shows a flowchart of another embodiment of a screen capture system according to the present invention.

DETAILED DESCRIPTION

Before the subject devices, systems and methods are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs.

It must be noted that as used herein and in the appended claims, the singular forms "a", "an", and "the" include plural referents unless the context clearly dictates otherwise.

Figure 1:
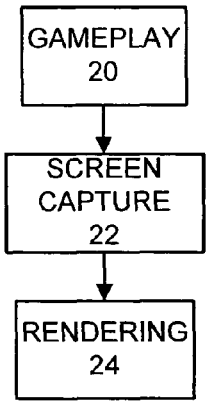
FIG. 1 shows a flowchart of a prior art screen capture system.
Figure 2:
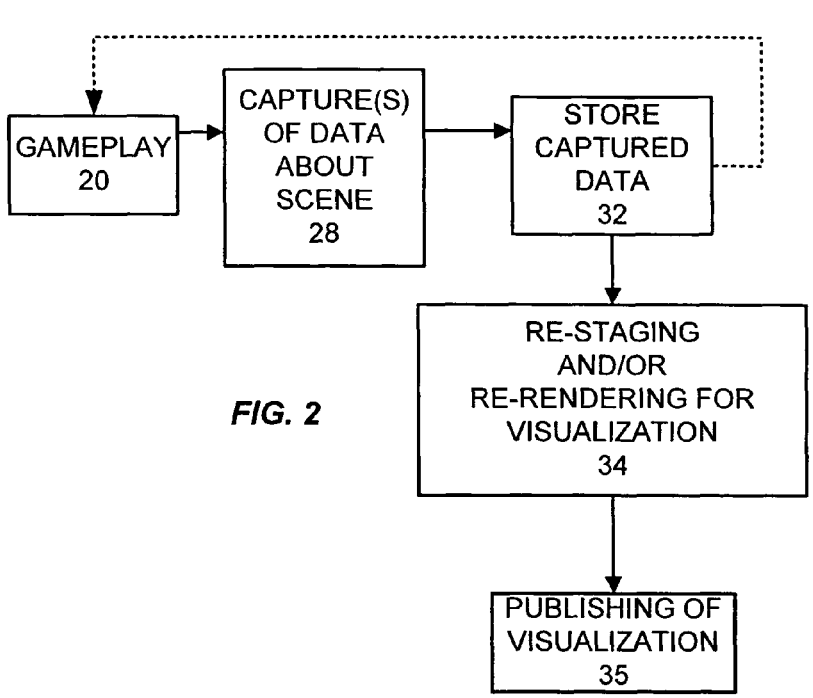
FIG. 2 shows a flowchart of an embodiment of a screen capture system according to the present invention.

Referring to FIG. 2, a flowchart is shown of a method according to an embodiment of the invention. By way of overview, during gameplay (step 20), data is captured about a scene that occurred in the gameplay (step 28). The captured data is stored (step 32). The stored data is then used as the basis for a step of re-rendering or re-staging, or both. The result of the step of re-rendering or re-staging is a visualization, which is then published (step 35).

These steps are now described in greater detail.

In step 28, the data is captured. However, this data is not necessarily that corresponding to a screenshot. Data corresponding to a screenshot would typically just be one set of pixel data as displayed on the screen at a given time. In contrast, the data captured in step 28 may be data about what characters are in the scene, what scenery is in the scene, the quests that have been attempted by the characters and the goals met, the positions and locations of characters and objects, or other such status-related details. All of this information, as well as user input at the client computer, may be employed to create the visualization. The pixel data of a screenshot may in some embodiments be used in the creation of a visualization, but even in this instance the data would be modified (step 34) from that present in the screen shot.

Figure 3:
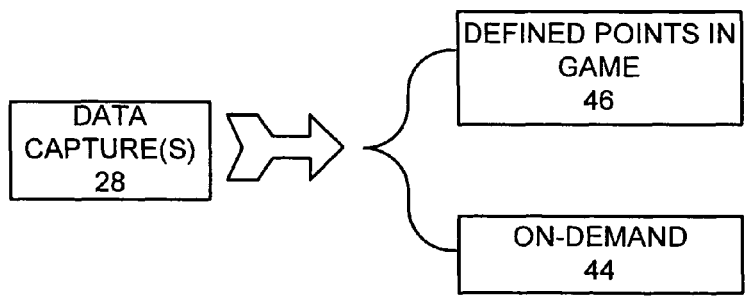
FIG. 3 shows details of a step in the flowchart of FIG. 2.

Referring in addition to FIG. 3, the data capture may be caused to occur via user input at the client computer (step 44), i.e., "on-demand", or at predefined points in a game (step 46). In the former, the user chooses when the data is captured. This alternative would be appropriate when a scene is of particular interest to the user, such as when a cohort of the user's friends are grouped in a particular location, a visually interesting scene is present, or other arbitrary times of the user's choosing. In the latter (step 46), the game server or visualization server chooses predefined points in a game when data corresponding to a scene is captured. In this alternative, the game server may choose to capture data whenever a quest is completed, whenever a particular type of task is accomplished, etc. The server may also choose to capture scenes corresponding to when a certain number of players are gathered together, or other such times that may be of interest to typical players following gameplay but are not necessarily points in the game they may choose themselves. The server may also choose to capture scenes on a periodic basis, e.g., every few minutes.

In step 32, the data is stored. The data may be stored as a flat file, in memory, or in a database. Referring also to FIG. 4, the data may be stored on the client computer 40', a server database 40, such as a game server, or a separate visualization server 41. The game server may also serve as the visualization server. The file may be stored as a flat file locally on the client before being sent to a server where it may then be put into the memory of the server, stored as a flat file on the server, or transposed into a database. Often, the data will be transferred to a visualization server 41 prior to a publication step as will be described below, although in some instances the creation of the visualization and subsequent publication may occur at the client computer.

In any case, it should be noted that the data storage step may be omitted in that the data may be operated on, e.g., at step 34, with little or no data storage per se occurring. The data storage may simply be the loading into memory of a portion of the data prior to its modification or transformation in step 34.

In step 34, the captured and stored data is modified or otherwise transformed in some way to create a visualization, often involving the re-staging or re-rendering of the data. In this step, the captured data from step 28 is employed to inform in part the composition and appearance of the visualization. In a re-rendering step, for example, if character information is part of the captured data, the characters may be presented in the visualization in a way similar to that displayed on the client computer screen but in higher resolution. In other words, rather than the low-polygon-count character images displayed at the client computer, which would also be that present in a screenshot, the character information is supplanted with high-polygon-count character data, creating a much richer presentation in the visualization.

The enriched data is made available by accessing (step 36) additional information about the game play at the point of the data capture. The additional information may be stored on a game or other such accessible server 40 or on in some cases on the client computer 40'. Additional character information may include high polygon count data about the character's face, hair, body, articles of clothing, weaponry, or any or all other aspects of the character's appearance. The same type of transformation from low-polygon-count to high-polygon-count may occur in the scenery used in the visualization, or other aspects of the game play to be presented in the visualization.

Step 34 may also include re-staging of characters and scenery. The user may desire that the visualization be reminiscent of the captured moment of game play, but have characters disposed in different positions or orientations, e.g., surrounding a defeated adversary. Thus, a visualization user interface would allow the player to rearrange the scene and characters as desired (step 38). This may include moving the characters to a more visually appealing portion of the scenery, moving the characters to different positions and orientations relative to each other, etc. Alternatively, if players were not present at the time of the captured moment of game play, these characters may be added and positioned (step 42) in the visualization as desired. Similarly, players may be removed from the visualization if desired.

In general, step 34 may be performed on a visualization server 41, to which data has been transferred from server 40, such as a game server, or client computer 40'. That is, visualization server 41 may be a server system separate from either the client computer 40' or the server 40. This may allow visualization server 41 to be conveniently coupled, e.g., with publication devices in a separate publication facility. However, as noted above, the visualization server 41 may also be integrated with the game server, allowing simpler transfer of captured data.

Moreover, the visualization server 41 may be considered a component within the client computer 40'. For example, the client computer may store, or at least be capable of accessing, high polygon count data corresponding to characters and scenery, even if only low polygon count data is displayed on the same during gameplay. A separate subsystem within the client computer 40' can serve as a visualization server 41 to: (1) cause the capture of data during gameplay; (2) re-staging or re-rendering of the data to create a visualization; and (3) subsequent publication of the visualization, e.g., a high polygon count display of the scene corresponding to the captured data, which can then be printed or otherwise published.

In step 35, the visualization is published. Publication in this sense can encompass a number of alternatives. For example, a single visualization can be published (step 48) as an image on an article of clothing, a high-quality poster or print reproduction, a computer wallpaper, an image on a web log, etc.

In a more complex embodiment, multiple images can be published (step 52), which is particularly useful in producing a comic book, graphic novel, web log, or historical document publication. In another embodiment, a movie can be published (step 54).

In a comic book implementation, for example, the visualizations may chronicle a quest or other desired story line. The visualizations may be entirely chosen by the player or by the game server or both. For example, a certain number of panels containing visualizations, e.g., 18 in number, may be pre-set and may be the same for all players. Another set of dynamically-generated panels containing visualizations, e.g., 8 in number, may be custom-designed by the player. In all cases, the visualizations may include characters, scenery, or other desired elements of the quest or story line.

The historical document may be a document that can describe how one or more players accomplished a given goal, e.g., a "walk-through", and may often be downloadable from a menu within the game. Such a historical document may chronicle, e.g, how the first player to accomplish a task or quest did so. Similarly, game resources may be made accessible to players, either online or offline, that include such historical documents. These may be made available in a virtual library, and the types of historical documents accessible in the virtual library may include any of the items mentioned in this description, including books, newspapers, magazines, tabloids, videos, television programs, pictures, etc.

The creation of historical documents may form part of a player character's activity. For example, in-game items such as virtual still or video cameras may be used by characters to virtually photograph scenes, and the scenes may then be published, virtually or actually, and subsequently made available in a virtual library.

In either single or multiple-image applications, the images can be annotated by custom text or by form text that has been written previously and then applied to known points of game play. Form text may be particularly appropriate for points of game play where the server is programmed to automatically capture data for use in a visualization, and may detail accomplishment of a goal or quest. Custom text may be written by the user for annotation of any visualization, including those chosen by the game server, in which case the annotation may replace or complement form text.

In a further embodiment, the visualization may be a movie, such as an mpeg. This embodiment may require more processing time than the individual image applications, however, the principle remains the same. For example, additional data such as high polygon count data may be added to each of a sequence of images to result in a high-resolution movie. As another example, a character may be moved to another portion of a visualization, or into or out of the visualization altogether, and that revised relative position may be maintained through the movie visualization. In a related embodiment, a character may move as the character did in the game play, but with a different initial position, resulting in a different position on the visualization. In any case, the movie may be made available to others via downloading from a web site, web log, or any other way in which such files may be transferred.

It should be noted that in the above embodiments, where the publication is to be on a screen of a computer, mobile phone, portable game player, PDA, etc., the use of high polygon count data may not be desired. For small screens in particular, use of low polygon count data may be advantageous. In this situation, the image may still be re-staged, may included additional or less characters, or may have other modifications made.

In another embodiment of the invention, as shown in FIG. 6, characters and scenery from a game are employed but the visualization is not based on any chosen point of game play: rather, the visualization is entirely and arbitrarily composed by the player or game server. In this embodiment, a user may access a database to design a desired visualization (step 56). The user may, e.g., desire to have a visualization of a posed grouping of their cohort of game players. Such a cohort may never have appeared together in the game, and thus the player may employ this embodiment to achieve a desired group visualization. In another example, the user may desire to have a visualization of a particularly famous or heroic character. In another embodiment, the game server or visualization server may automatically create a composition for use in a visualization (step 58). For example, the server may automatically create a composed group picture of characters, may automatically create a high-quality image of each character in a heroic pose, or may automatically create a high-quality image whenever a goal is attained.

In these embodiments, a subsequent re-staging or re-rendering step (step 34) may not be necessary, although the same may be offered as an option.

A publication step (step 35) is then performed following creation of the visualization, and this publication step is analogous to that described above.

According to the present invention, as fully described above, a system is provided that allows high quality visualizations to be created from game play or from arbitrarily-staged scenes corresponding to game play. The visualizations may be employed as the basis for numerous types of publications.

While the invention has been described in the context of online gaming, it should be clear to one of ordinary skill in the art given this teaching that the invention is broader than the embodiments described. In particular, the invention may encompass any software in which a publication is desired of screen elements.

Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

The invention claimed is:

1. A method of creating a visualization based on a displayed scene at a specified moment of game play, the method comprising:
    displaying, at a client computer, at least one game scene, wherein the at least one game scene comprises characters and scenery corresponding to game play of a game at the client computer, wherein the at least one game scene is displayed at a first resolution;
    determining, via an input at the client computer from a player, a particular displayed game scene that is to be captured;
    capturing, at the client computer, first scene data corresponding to the particular displayed scene;
    sending from the client computer, via a communication network, the captured scene data to a visualization server; and
    sending from the client computer, via the communication network, additional scene data to the visualization server, wherein the additional scene data corresponds to a plurality of views of the characters and scenery at a second resolution, wherein the second resolution is higher than the first resolution, whereby the visualization server may render a visualization using the captured scene data with the additional scene data sent by the client computer and publish the visualization on the client computer, wherein the published visualization comprises a graphical view of the particular displayed game scene at a third resolution, the third resolution is higher than the first resolution.

2. The method of claim 1, wherein the visualization server and the client computer are the same.

3. The method of claim 1, wherein the additional scene data corresponds to characters which have been added or removed from the displayed game scene.

4. The method of claim 1, wherein the additional scene data corresponds to characters which have been re-staged or re-positioned from the displayed game scene.

5. The method of claim 1, wherein the input at the client computer comprises a user input at the client.

6. The method of claim 1, wherein the input at the client computer comprises an input received from the game server.

7. The method of claim 6, wherein the particular displayed game scene is automatically determined by the game server following completion of one of a predefined set of tasks.

8. The method of claim 6, wherein the particular displayed game scene is automatically determined by the game server, wherein the automatic determination occurs periodically.

9. The method of claim 1, further comprising creating a plurality of visualizations.

10. The method of claim 9, further comprising publishing the plurality of visualizations.

11. The method of claim 10, wherein the publishing is selected from the group consisting of inserting the plurality of visualizations into a web log, inserting the plurality of visualizations into a comic book, and inserting the plurality of visualizations into an electronic document and storing the electronic document on a game server for later downloading.

12. The method of claim 1, further comprising creating a plurality of substantially continuous visualizations to form a movie.

13. The method of claim 12, further comprising storing the movie for later downloading.

14. The method of claim 1, wherein the publishing is selected from the group consisting of creating a high-quality print of the visualization, creating an article of clothing that displays the visualization, and creating a poster of the visualization.

15. A method of creating visualization based on a displayed scene at a specified moment of game play, the method comprising:
    displaying, at a client computer, at least one game scene, wherein the at least one game scene comprises characters and scenery corresponding to game play of a game at the client computer, wherein the at least one game scene is displayed at a first resolution;
    determining, via an input at the client computer from a player, a particular displayed game scene of at least one game scene that is to be captured;
    capturing, at the client computer, first scene data corresponding to the particular displayed scene, wherein the first scene data comprises information regarding the characters, the scenery and the location of the characters and the scenery which are to be included in said visualization;
    sending from the client computer, via a communication network, the captured scene data to a visualization server; and
    sending from the client computer, via the communication network, additional scene data to the visualization server, wherein the additional scene data corresponds to a plurality of views of the characters and scenery at a second resolution, wherein the second resolution is higher than the first resolution, whereby the visualization server may render a visualization using the captured scene data with the additional scene data sent by the client computer and publish the visualization on the client computer, wherein the published visualization comprises a graphical view of the particular displayed game scene at a third resolution, the third resolution is higher than the first resolution.

16. The method of claim 15, wherein the visualization server and the game server are the same.

17. The method of claim 15, further comprising creating a plurality of visualizations.

18. The method of claim 17, further comprising publishing the plurality of visualizations.

19. The method of claim 18, wherein the publishing is selected from the group consisting of inserting the plurality of visualizations into a web log, inserting the plurality of visualizations into a comic book, and inserting the plurality of visualizations into an electronic document and storing the electronic document on a game server for later downloading.

20. The method of claim 15, further comprising creating a plurality of substantially continuous visualizations to form a movie.

21. The method of claim 20, further comprising storing the movie for later downloading.

22. The method of claim 15, wherein the publishing is selected from the group consisting of creating a high-quality print of the visualization, creating an article of clothing that displays the visualization, and creating a poster of the visualization.

\* \* \* \* \*